United States Patent
Hornkvist

(10) Patent No.: US 9,454,556 B2
(45) Date of Patent: Sep. 27, 2016

(54) INDEXING USING A LOCKLESS BURST TRIE

(71) Applicant: Apple Inc., Cupertino, CA (US)

(72) Inventor: John M. Hornkvist, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 178 days.

(21) Appl. No.: 14/053,564

(22) Filed: Oct. 14, 2013

(65) Prior Publication Data

US 2014/0108416 A1 Apr. 17, 2014

Related U.S. Application Data

(60) Provisional application No. 61/714,012, filed on Oct. 15, 2012.

(51) Int. Cl.
*G06F 17/30* (2006.01)

(52) U.S. Cl.
CPC ... *G06F 17/30336* (2013.01); *G06F 17/30958* (2013.01)

(58) Field of Classification Search
CPC ............. G06F 17/30336; G06F 17/3958; G06F 17/30312; G06F 17/30289; G06F 17/30631; G06F 17/30958; G06F 17/30327; G06F 17/30625
USPC .......... 707/673, 696, 797, 780, 753
See application file for complete search history.

(56) References Cited

U.S. PATENT DOCUMENTS

| | | | |
|---|---|---|---|
| 6,014,690 A | 1/2000 | VanDoren et al. | |
| 6,829,602 B2 * | 12/2004 | Avadhanam | G06F 17/30327 |
| 2008/0275837 A1 * | 11/2008 | Lambov | G06F 17/30985 706/48 |
| 2010/0293332 A1 | 11/2010 | Krishnaprasad et al. | |
| 2013/0268770 A1 * | 10/2013 | Hunt | G06F 17/3033 713/189 |

OTHER PUBLICATIONS

Heinz et al., Burst Tries: A Fast, Efficient Data Structure for String Keys, 2002, pp. 1-31.*
Sinha et al., Efficient Trie-Based Sorting of Large Sets of Strings, 2003, pp. 1-8.*
Gidenstam, et al., "Efficient Lock-Free Queues that Mind the Cache", Proceedings of the third Swedish workshop on Multi-Core Computing, Published 2010, 4 pp.
Maged M. Michael, "Safe Memory Reclamation for Dynamic Lock-Free Objects Using Atomic Reads and Writes", IBM Thomas J. Watson Research Center, Jul. 21-24, 2002, Monterey, CA.
Gidenstam, et al., "Allocating Memory in a Lock-Free Manner", Dept. of Computer Science and Engineering, Chalmers University of Technology, SE-412 96m Goteborg, Sweden, 2005, pp. 329-342.

* cited by examiner

*Primary Examiner* — Leslie Wong
(74) *Attorney, Agent, or Firm* — Blakely, Sokoloff, Taylor & Zafman LLP

(57) ABSTRACT

Lockless burst trie indexing inserts marker nodes into a linked list of data and marker nodes, each marker node corresponding to a symbol in an ordered data sequence stored in the data nodes. A trie structure contains entries that represent the symbols of the marker nodes and point to the corresponding marker nodes. The trie structure can contain multiple levels of entries that are linked together in a hierarchy to represent subsets of the data sequences.

20 Claims, 9 Drawing Sheets

INDEXING USING A LOCKLESS BURST TRIE

RELATED APPLICATIONS

This application claims priority to U.S. Provisional Patent Application 61/714,012, filed Oct. 15, 2012 and assigned to the same assignee as the present application.

FIELD OF THE INVENTION

This invention relates generally to data storage and retrieval, and more particularly to storing and retrieving data strings indexed using a trie structure.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies: Copyright © 2011, Apple Inc., All Rights Reserved.

BACKGROUND

A trie structure is often used to index ordered data sequences of symbols, such as strings of numbers and/or letters, in a computer system, with at least a portion of the data sequence being stored in nodes in linked lists, each of which pointed to by an entry in the trie that represents one or more starting symbols in the data sequence. Depending on the number of data sequences, the trie can have multiple levels, with the first level representing the first symbol, the second level representing the third level, etc. Typically, a trie is burst to create an additional level when one or more of the linked lists exceed a certain threshold of nodes when new data sequences are added. Levels in the trie can be deleted if the linked lists decrease below the threshold due to the deletion of data sequences.

Because the data sequences can only be accessed through the trie structure, locking mechanisms are employed on the trie structure to avoid simultaneous and conflicting changes being made to the trie structure. As a result, additional processes must be employed to avoid incurring race conditions caused by locking the trie structure.

SUMMARY

Lockless burst trie indexing inserts marker nodes into a linked list of data and marker nodes, each marker node corresponding to a symbol in an ordered data sequence stored in the data nodes. A trie structure contains entries that represent the symbols of the marker nodes and point to the corresponding marker nodes. The trie structure can contain multiple levels of entries that are linked together in a hierarchy to represent subsets of the data sequences.

DETAILED DESCRIPTION

In the following detailed description of embodiments of the invention, reference is made to the accompanying drawings in which like references indicate similar elements, and in which is shown by way of illustration specific embodiments in which the invention can be practiced. These embodiments are described in sufficient detail to enable those skilled in the art to practice the invention, and it is to be understood that other embodiments can be utilized and that logical, mechanical, electrical, functional and other changes can be made without departing from the scope of the present invention. The following detailed description is, therefore, not to be taken in a limiting sense, and the scope of the present invention is defined only by the appended claims.

Figure 1A:
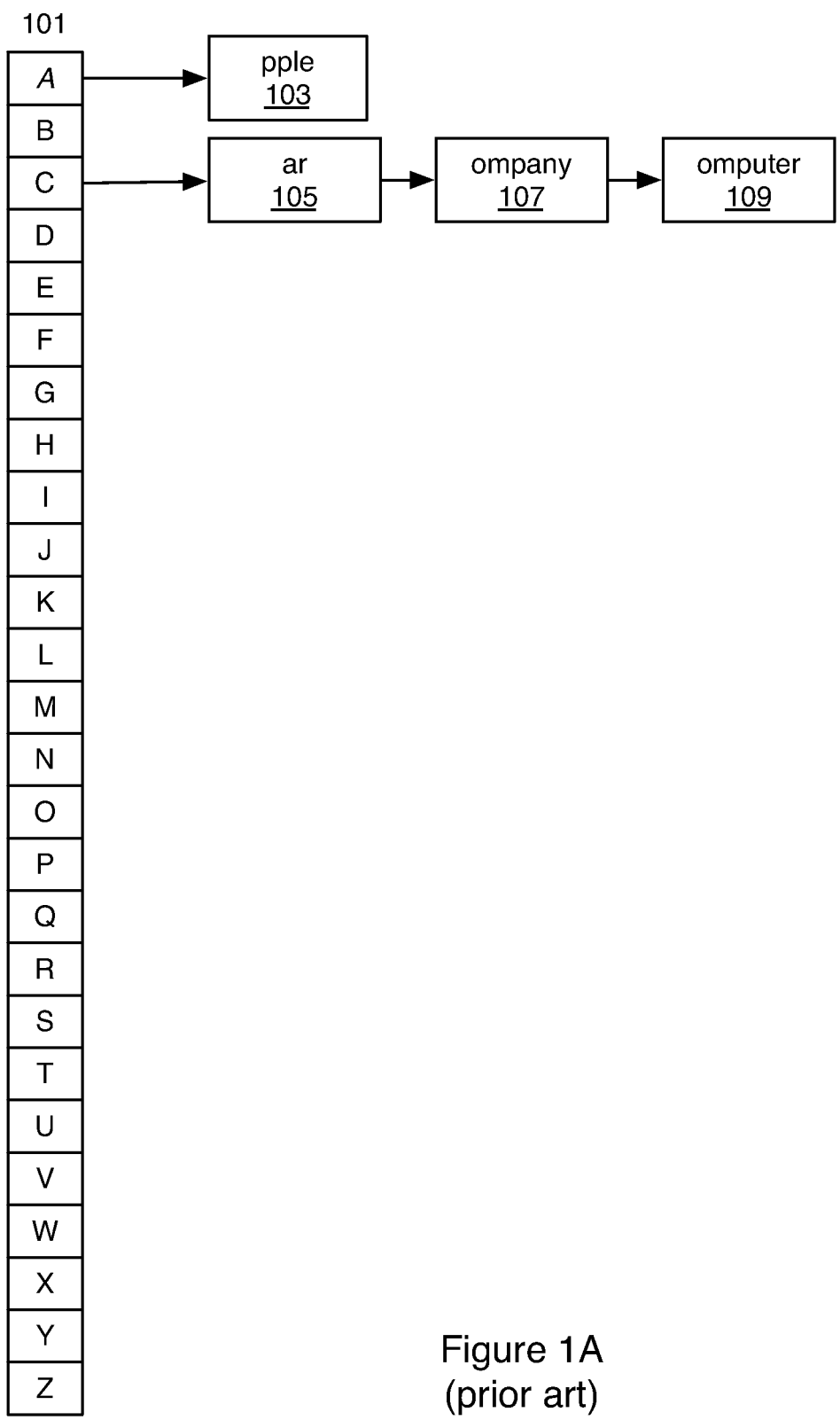
FIG. 1A is a diagram of a single level prior art trie structure that indexes a set of data strings.

Beginning with an overview of the operation of lockless burst trie indexing of an ordered data sequence of symbols in a computer system, FIG. 1A illustrates a prior art single level trie structure 101 that indexes four data strings: apple, car, company, and computer. Each entry in the trie structure 101 represents a first character in a data string. For ease in understanding, the examples do not distinguish between upper and lower characters in the entries in the trie structure 101. The data strings are stored in data nodes and data nodes for strings having the same first character are linked together in a sorted order as illustrated in FIG. 1A by the list that links "car" data node 105, "company" data 107 and "computer" data node 109. Each entry in the trie structure 101 points to the first data node in the linked list for the corresponding first character. Thus, in FIG. 1A, entry A points to "apple" data node 103 and entry C points to "car" node 105. In the embodiment illustrated in FIG. 1A, first character for the data string is not stored in the data node because the data strings are accessed solely through entries in the trie structure 101.

Figure 1B:
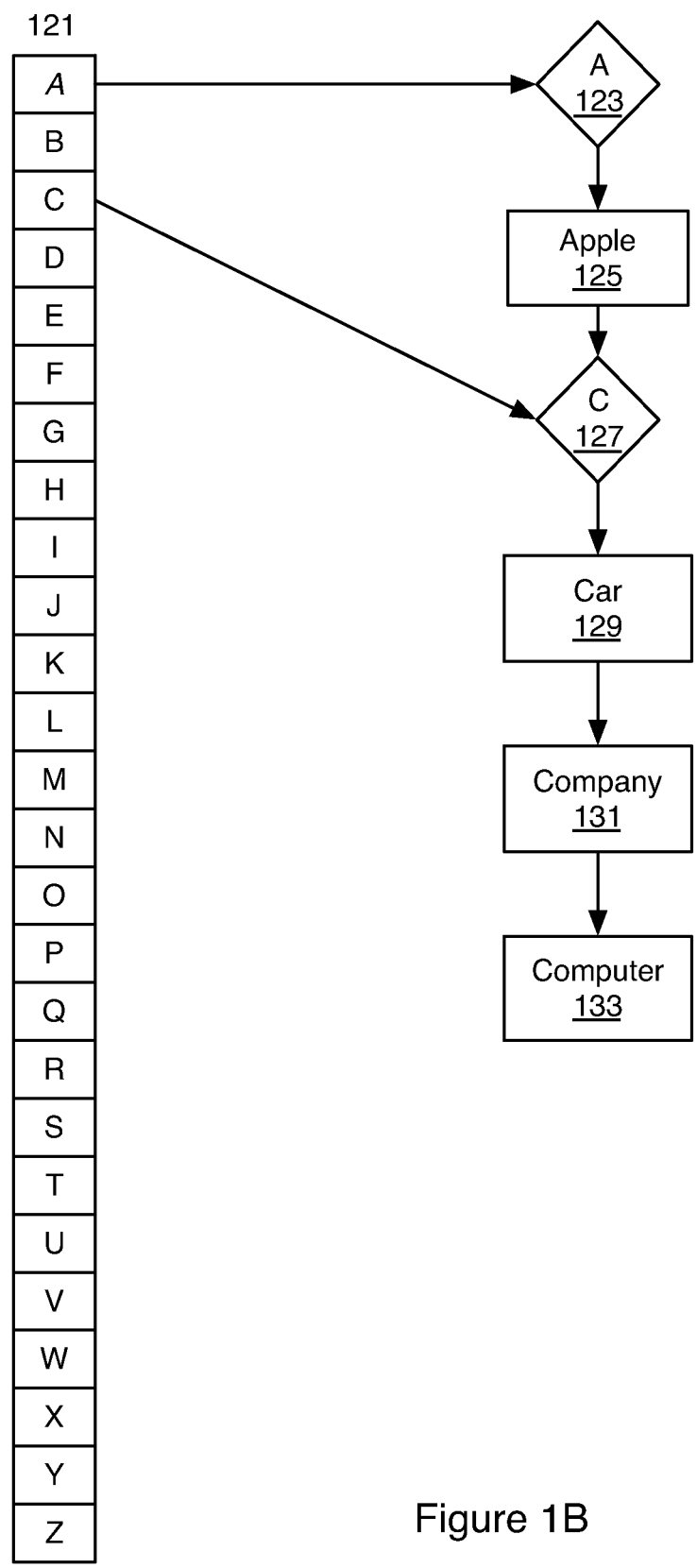
FIG. 1B is a diagram of single level lockless burst trie structure that indexes the same set of data strings as in FIG. 1A.

FIG. 1B illustrates the same set of data strings when indexed using one embodiment of a lockless burst trie structure 121 that references marker nodes in the corresponding linked list. Instead of an entry in the trie structure pointing to the first data node in the corresponding linked list, each entry points to a marker node representing a string character, such as marker node 123 for "A" and marker node 127 for "C." The data nodes 125, 129, 131 and 133 are linked in a single ordered list, with each data node having a pointer to the next data node in the list and containing a full data string, which allows traversing the linked list to search for a data string in addition to searching using the trie structure 121. The marker nodes also contain pointers and are inserted at fixed positions in the list to indicate the first data node for a string having the same first character as the marker node. A marker node can be any type of node that is distinguishable from a data node. In one embodiment, the marker node is indicated by a bit in its pointer. In one embodiment, the lockless burst trie structure 121 and the linked list are created as data strings are added as described in conjunction with FIG. 6 below.

Figure 2A:
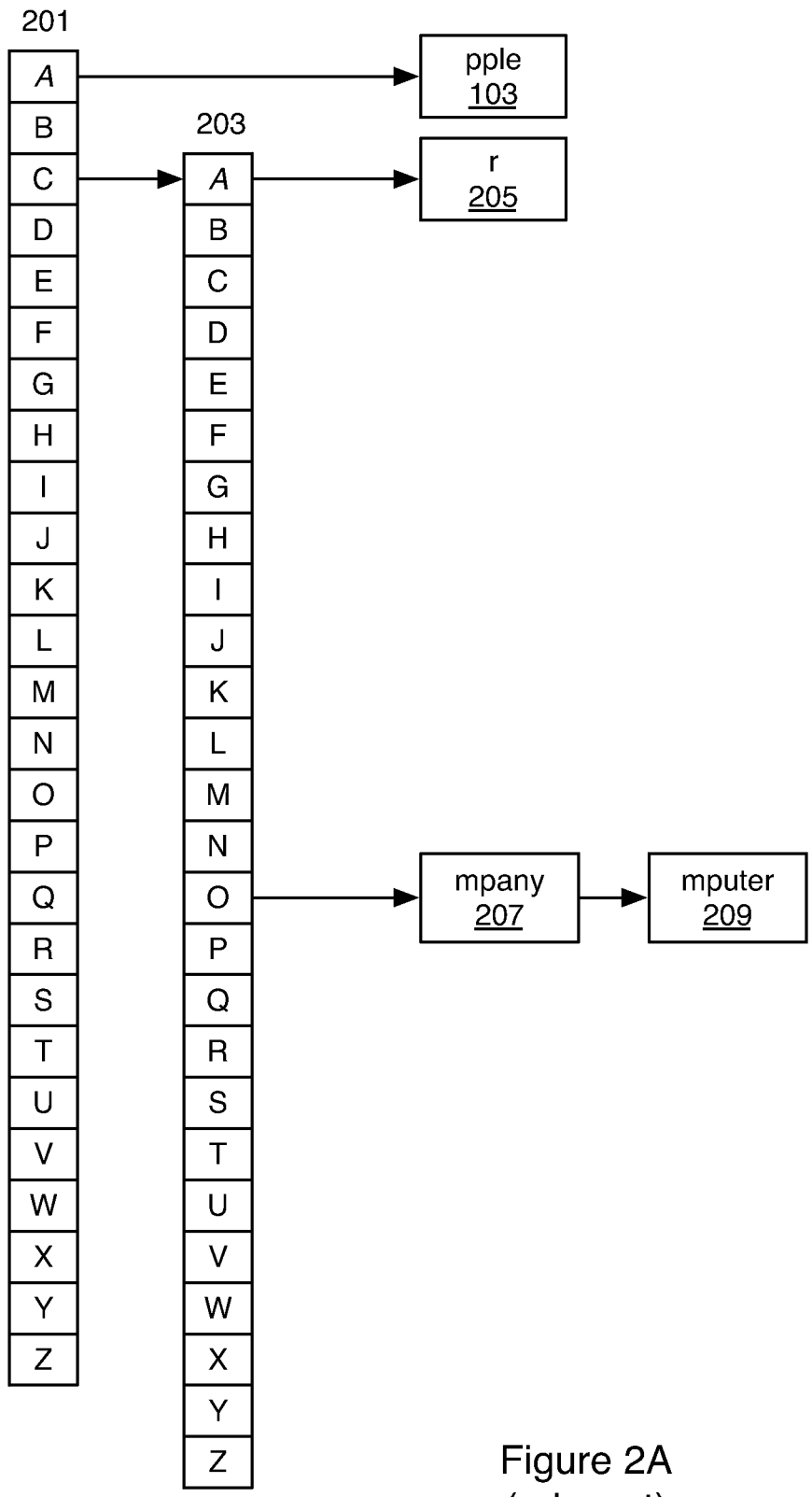
FIG. 2A is a diagram of a two level prior art trie structure after bursting the trie structure of FIG. 1A.

When the trie structure 101 of 1A bursts, a second level for the trie is created to represent the second characters in the data strings. As illustrated in FIG. 2A, after bursting the single level trie 101 of FIG. 1A, the entry "C" in the first level 201 of the trie points a second level 203 containing pointers to the corresponding data nodes. For example, the entry "A" in the second level 203 represents the second letter "a" in the data string "car" and points to data node 205 containing the data string "r" for "car," and the entry "O" points to the data node 207 containing the data string "mpany" for "company." Because the data string "computer" also begins with the data string "co," the data node 209 is linked to data node 207.

Figure 2B:
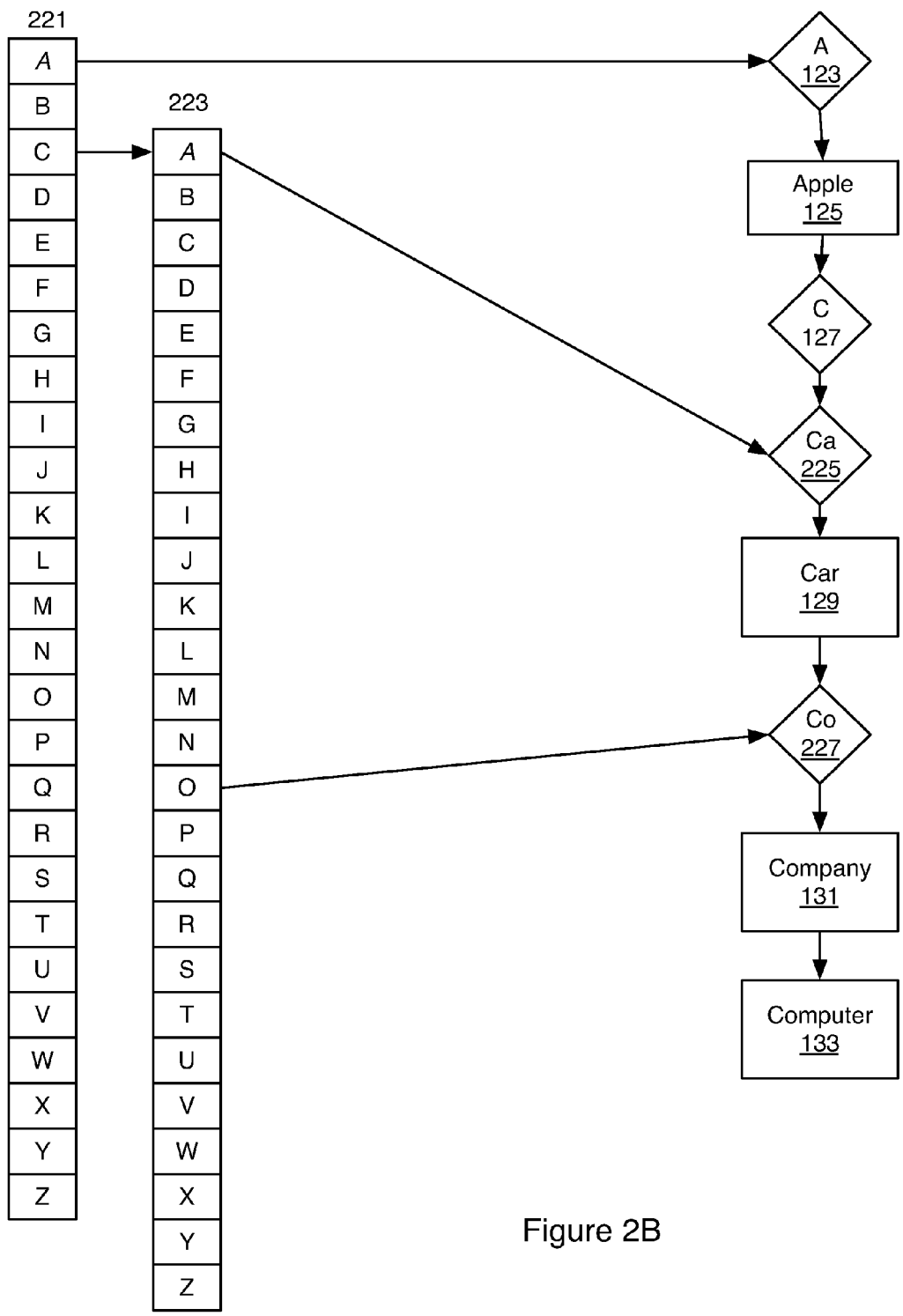
FIG. 2B is a diagram of a two level lockless burst trie structure after bursting the trie structure of FIG. 1B.

FIG. 2B illustrates the lockless trie structure of FIG. 1B after bursting. As in FIG. 1B, a second level 223 is created and linked to the entry "C" in the first level 221. The entries for "A" and "O" in the second level 223 point to marker nodes "Ca" 225 and "Co" 227 that are inserted into the linked list during the bursting process using a burst trie method 300 illustrated in FIG. 3 and described next.

The method 300 is performed by a processor for each entry in a new n level that represents the $n^{th}$ character in an existing data string. It will be appreciated that the method 300 can be performed during the initial creation of a new level due to a burst, or subsequently during insertion of a new data string as described below in conjunction with FIG. 6. Although the method 300 is performed for any new level in the trie, for ease in understanding, it will be assumed that the new level is the second level 223 representing the second character as shown in FIG. 2B. At block 301, the method 300 gets the existing marker node that corresponds to the entry that is being burst, e.g., marker node 127 for entry "C." At block 303, the method 300 determines the appropriate insertion point in the linked list. In one embodiment, the method 300 traverses the linked list from the existing marker node until it reaches a node having second character that is greater in the sort order than the second character represented by the second level 223 entry. The method 300 constructs the new marker node for the first two characters at block 305, e.g., marker node 225 for "Ca." At block 307, the method 300 constructs the appropriate pointers for the second level 223 and the nodes in the linked list. Thus, the pointer in marker node 127 that points to data node 129 is now stored in marker node 225, the pointer in marker node 127 is changed to point to marker node 225, and the entry "A" in the second level 223 points to marker node 225. It will be appreciated that although no entry in the trie will point to marker node 127 after the burst, in the embodiment shown in FIG. 2B, the marker node 127 remains in the linked list to avoid having to recreate the marker node 127 if the second level 223 is deleted as discussed next in conjunction with FIGS. 4 and 5. In an alternate embodiment, the marker node 127 is deleted.

Figure 4:
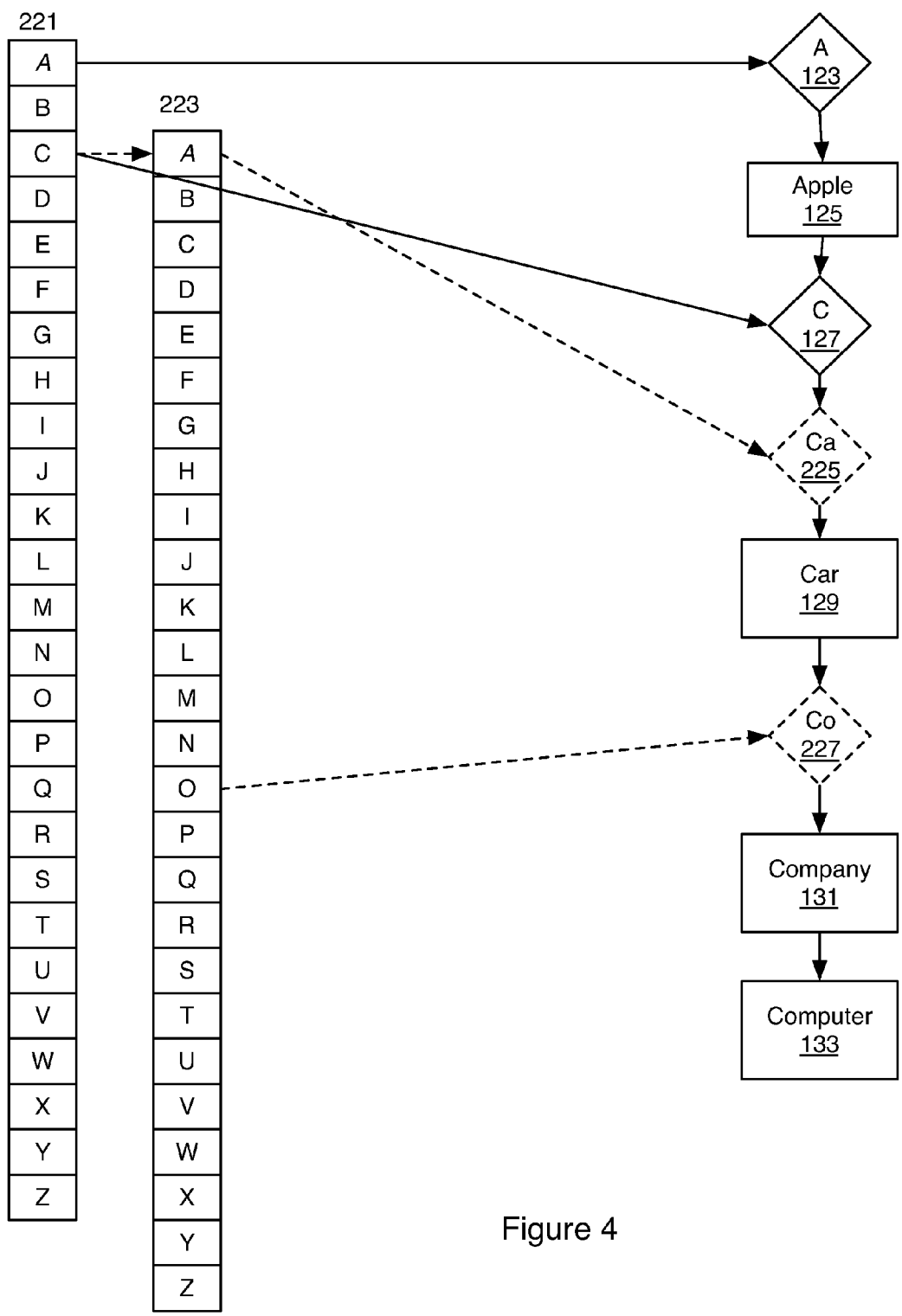
FIG. 4 is a diagram of the lockless burst trie structure of FIG. 2B after the second level of the trie is deleted.
Figure 5:
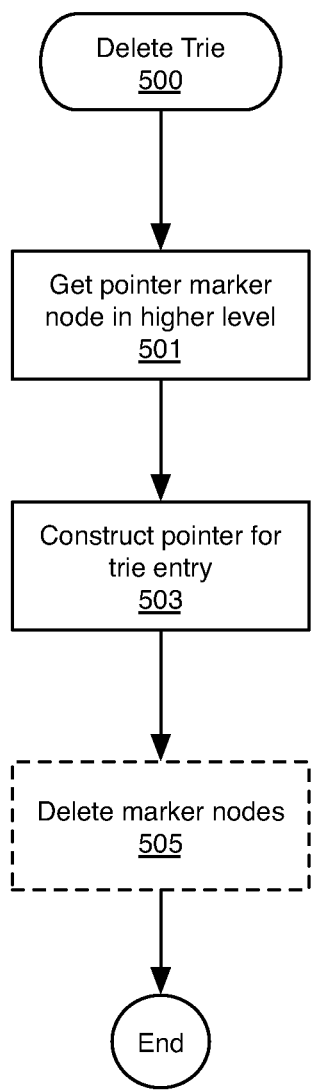
FIG. 5 is an embodiment of a flow diagram of a method to be performed by a computer executing lockless burst trie indexing software when a lockless burst trie level is being deleted.

FIG. 4 shows the changes in the lockless burst trie structure 221 and the marker nodes of FIG. 2B when the second level 223 is being deleted using a delete trie method 500 illustrated in FIG. 5. At block 501, the method 500 gets the marker node corresponding to the entry in the first level 221 that points to the second level 223 being deleted, i.e., marker node 127 corresponding to the character "C." In one embodiment, the method 500 traverses the linked list to find the appropriate marker node by starting with the marker node pointed to by an entry in the first level 221 that represents a character which is less than the character whose second level 223 is being deleted; in the present example, the entry in the first level 221 would be "A" and the starting marker node would be marker node 123. At block 503, the method 500 constructs the pointer in the first level 221 to point to the marker node found at block 501. Optionally, the method 500 can delete the unused second level marker nodes and relink the data nodes at block 505 (shown in phantom). Leaving the second level marker nodes in place avoids having to recreate the marker nodes if the first level entry bursts at a later time.

Figure 6:
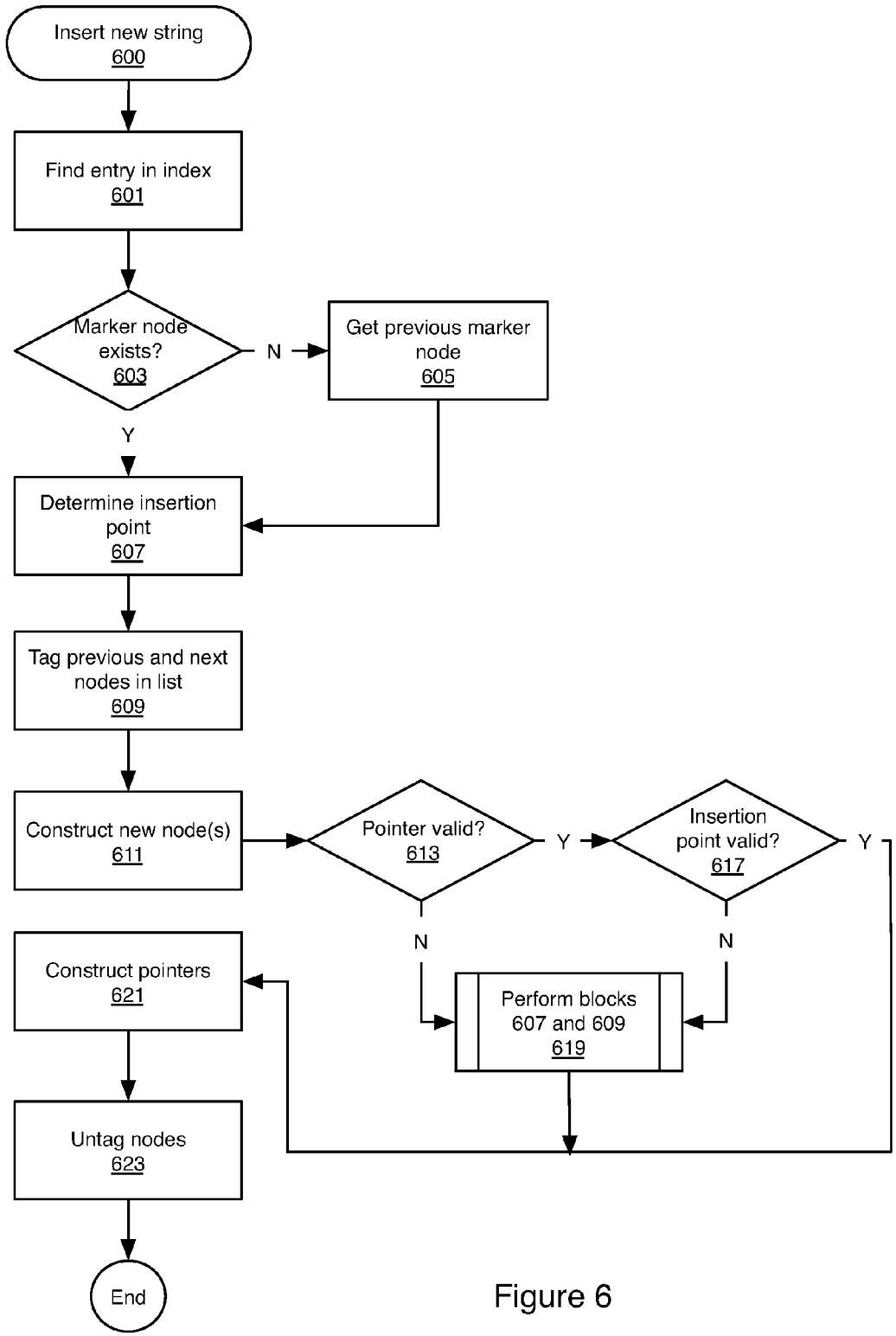
FIG. 6 is an embodiment of a flow diagram of a method to be performed by a computer executing lockless burst trie indexing software when a new data string is being added.

FIG. 6 illustrates one embodiment of a method 600 performed by a processor when a new string is to be inserted into the linked list of data nodes. For ease in understanding, it will be assumed that the lockless burst trie contains a single level such as in FIG. 1B. At block 601, the method 600 finds the appropriate entry in the lowest trie level for the string, e.g., level 121. At block 603, the method 600 determines if the corresponding marker node exists in the list. If not, at block 605, the method 600 gets the previous marker node. For example, if the new string is "compiler," the corresponding marker node is existing marker node 127, but if the new string is "dog," there is no corresponding marker node. In this case, the method 600 uses level 121 to find the previous marker node, e.g., marker node 127. In an alternate embodiment, the method 600 traverses the linked list to find the previous marker node.

The appropriate insertion point in the linked list is determined at block 607 by traversing the linked list from the marker node until a node is found that is greater in sort order than the new string. The found node and the node previous to the found node are tagged as being "of interest" at block 609. Referring again to FIG. 1B, the found node would be data node 133 and the previous node would be data node 131. In one embodiment, the nodes are tagged using a counter that is stored in metadata in the node structure.

The new node is constructed at block 611. If the appropriate marker node exists, as determined at block 603, the new node is a data node containing the new string. If the appropriate marker node does not exist (block 603), two new nodes will be constructed, a marker node and a data node. In one embodiment, storage space optimization, as described below, is also be performed at block 611 when constructing a new nodes. It will be appreciated that in a parallel processing environment, a concurrent thread could have executed burst trie method 300 and caused the appropriate marker node to be constructed between the time the thread currently executing method 600 performed blocks 603 and 611. In such an environment, the processing at block 611 would also check if the appropriate marker node exists before creating it.

It will further be appreciated that the trie structure and the linked list may change due to insertions or deletions while the new node(s) are being constructed at block 611. At block 613, the method 600 determines if the pointer in the previous node is valid. For example, if data node 133 in FIG. 1B is replaced by a data node having a different data string, such as "compass," while the data node for "compiler" is being inserted, the pointer in data node 131 is no longer valid because "compiler" is after "compass" in the sort order. If the pointer is not valid, at block 619, the method 600 performs the processes represented by block 607 and 609 again to determine the correct insertion point. If the pointer is valid, the method 600 determines if the current insertion point is still correct at block 617, and performs block 619 if not. For example, assume the data node for "compass" was inserted while the data node for "compiler" was being constructed. Thus, the correct insertion point for the data node for "compiler" would be between the data node for "compass" and data node 133, not between data node 131 and the data node for "compass." Similarly, if data node 131 was deleted, the correct insertion point would be between marker node 127 and data node 133.

At block 621, the method 600 constructs the appropriate pointers in the new node(s) in the list. In one embodiment, if only a data node is being inserted, the pointer from the previous node is stored in the new node and the pointer in the previous node is replaced with a pointer to the new node. If both a marker node and a data node are being inserted, the pointer from the previous node is stored in the new data node and the pointer in the previous node is replaced with a pointer to the new marker node. In addition, the pointer in the new marker node would be constructed to point to the new data node and the pointer in the entry in level 121 that corresponds to the new marker node would be constructed to point to the new marker node. In one embodiment, the processes represented by blocks 613-621 is performed as an atomic transaction so any interrupting during the processes does not result in mismatched pointers. Because the method 600 handles changes in the trie structure and linked list while it is inserting new data strings, there is no need to impose locks on the trie structure. The tagged nodes are untagged at block 623 to complete the insertion of the new string.

It will be appreciated that adding a new data string may cause the trie to burst, at which point a processor would perform the burst trie method 300 before or after inserting the new data string into the trie. In one embodiment, the bursting occurs after.

The storage space optimization mentioned above when constructing a new data node takes advantage of the closest preceding marker node containing at least some of the beginning symbols (prefix) of the data string. Instead of duplicating the prefix symbols in the new data node, the number of bytes corresponding to the prefix in the marker node is stored in the data node. For example, assuming a marker node containing "car", then the data node for "car" contains the number of prefix bytes in the marker that spell "car" (3), followed by an empty string " ", i.e., (3)" ". Similarly, "cars" can be stored as (3)"s", and carburetor as (3)"burator". The resulting trie would be "car"→(3)" "→(3) "burator"→ . . . →(3)"s". Storing the number of symbols of the prefix also avoids confusion that could be caused by subsequent insertion of new marker nodes. For example, if "carbohydrate" is inserted and causes a new marker node of "carb" and a new trie level with a marker node of "cars" to be created, the resulting trie would be "car"→(3)" "→"carb"→(4)"ohydrate"→(3)"burator"→ . . . →"cars"→ (3)" ". It will be appreciated that the same prefix optimization can be applied to the marker nodes when created at block 611. The value can be reconstructed at search time by recreating the path through the trie levels when the marker node was created.

Memory conflicts can arise when different threads are changing the same trie. For example: If thread A deletes node N from the trie and releases the memory for it between the time thread B acquires the pointer to node N, and the time that thread B de-references node N (loads the data at the address of node N), the memory may no longer be readable by the process, which could cause the process performing the trie indexing to crash, or contain invalid data, leading to invalid results. Such memory corruption can be avoided by employing any one of several well-known methodologies. Examples include an automatic garbage collector instead of explicit deallocation, an synchronization system such as RCU (read-copy-update), where a deallocator tracks what code other threads are executing and avoids deallocating data when any thread is in a section where it could have referenced the data, hazard pointers, type safe memory in which memory once used by the trie would not be used for anything else, or safe reference counting that tracks the number of references to the memory.

While the data nodes have been described as containing only a data string and a pointer, alternate structures are applicable. For example, if lockless burst trie indexing is used to index content in files, each data node could contain a pointer to the files in which the data string appears. Additional, while the trie structure and data nodes have been described as containing data strings for words for ease in understanding, any type of ordered data that can be expressed as a sequence of bits can be indexed using lockless burst trie indexing. When dealing with certain types of data, such simple integers, device addresses, etc., the data sequence can be assumed to be uniformly long, i.e., 64 bits, but no limit to the length of data sequences indexed in the trie is implied. Although the examples given above assume a cardinality of 256, processing one byte at a time, the lockless burst trie can be implemented using any cardinality greater than or equal to two, though typically a power of two would be used.

Applications using different types of data sequences are also contemplated. For example, a map for virtualizing a data storage device, such as memory or a mass storage device, can be created by using the trie levels to contain the logical addresses, while the data nodes contain the corresponding physical addresses.

For a example of using a lockless burst trie to virtualize a mass storage device, consider a single file system that needs to span multiple devices, with the ability to add and remove devices, but with the file system having been written assuming single physical device with sequential block addresses. To enable the file system to work over multiple devices, a logical device process is written to present sequential logical block addresses and map them to physical addresses on the underlying hardware. In this example, each data node in the linked list would contain a logical address, optionally an "extent" (i.e. the number of blocks that can be sequentially mapped from this point if mapping ranges of blocks rather than single blocks), a physical address and a device identifier.

The file system issues a read or write request for a logical address v. Using the trie, a virtualization process on the logical device process would find a data node n in the linked list such that address(n)<=v<address(n)+size(n), and use the physical address (physical(n)+(v-address(n))) to get the address to read or write from the hardware device(n). When allocating an extent for a file in the file system, space is allocated on the physical devices, an appropriate insertion point in the linked list is found using the trie. The trie is used to look up the highest possible value to find the highest address in the list, the next higher value is returned, and the data node is inserted as normal. If a conflicting insert happened, the operation will fail and the logical device process will retry to find available space.

A lockless burst trie can also be used to implement a "vm_map" for memory, which is a per-processes entity used by various operating system kernels to map addresses in the process' memory space to their physical backing (files on disk, anonymous memory, etc.). Some set of properties (read-only, read-write, executable, copy-on-write, wired, etc.), as well as information about what parts of this address range are in physical memory (e.g. by using an array with one value per page of memory) can also be included in, or referenced by, the data nodes.

When a process memory maps a file (e.g. using a mmap call) the operating system kernel creates a vm_object containing information about the file and the properties desired, and some additional metadata, finds a range of virtual memory to map it to, and inserts it into the trie for vm_map. When the process tries to access a memory address corresponding to this vm_object, a "fault" is generated, the process is suspended, and the kernel looks up the address in the vm_map trie. If the address exists, the kernel reserves a page of physical memory, reads from the file into that page, updates the vm_object, and unsuspends the process. Unmapping (e.g. using a munmap call) similarly includes looking up and removing the vm_object from the trie, and processing the vm_object to release any resources (files, physical memory) it references.

Other operating system memory functions can also use the lockless burst trie. A standard memory call, malloc(size), returns a memory address to the beginning of an allocation of size. When the user calls free on that address, the operating system has look up the size of the allocation to return the right amount of memory to the pool of available memory. The address can be the index used in the trie with the size value stored in the data nodes. malloc_zone_malloc is an alternate interface to malloc that takes a memory zone in addition to a size as an argument and returns an address. When the user calls free, the operating system has to map from the address to the zone that the allocation came from. The lockless burst trie can store all the memory ranges in use by all the zones to map from memory address to zone when malloc_zone_malloc is called.

Additionally, text and metadata indexing can use the lockless burst trie. For example, when indexing the contents of a mass storage device, the lockless burst trie would allow searches to occur concurrent with document indexing. The index data would be the data strings and the data nodes would contain the pointers to lists of document identifiers for the documents containing the terms, and/or position data for where in these documents the terms occur. For another example, in a database, it is frequently helpful to have an index for a particular database column (or a particular database field in a key value store). The lockless burst trie can be used to implement this index, allowing concurrent access to the database.

The lockless burst trie can also be used as part of another data structure such as a lockless sparse array, sparse bitmap, or extensible hash table. A lockless sparse array can be either fine or course grained. In the fine grained example, a data node in the linked list is created for each array entry that is used. In the course grained example, a "range" of entries in the trie is allocated and a sub-array is associated with each data node. In either case, to find the item at index N, a process would look up the node with index<=N, and calculate the sub-index for N within that range (N-index). If N is outside the range, the item does not exist in the sparse array. Insertion works similarly, except that if N does not exist, a new node is created, and when inserting into the sub-array, an atomic "compare-and-swap," or equivalent, is used to ensure that the insertion is atomic. The lockless sparse bitmap is similar to the lockless sparse array and uses operations to set a value of a bit, and check the value of a bit. For setting the value, the atomic compare-and-swap operation or similar atomic operation is used. The lockless extensible hash table implementation uses the result of a hash function as the key into the trie, and any hashing collisions can be resolved in using the data nodes in the linked list, or by suffixing the hash key with the real key.

Figure 7:
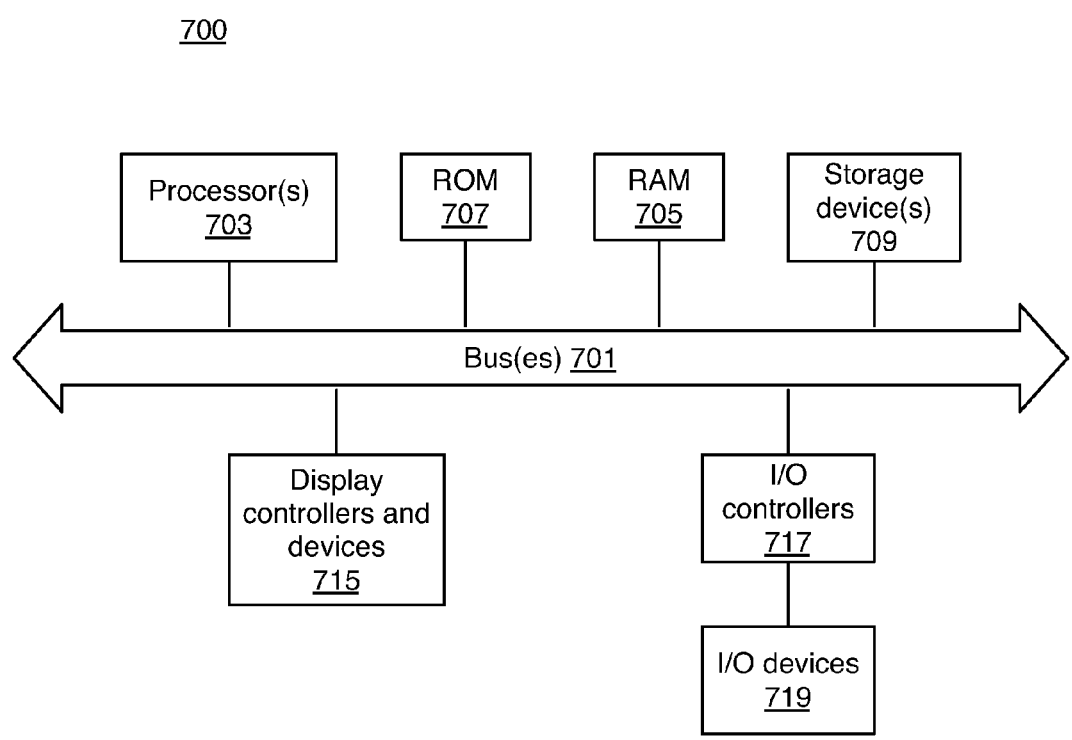
FIG. 7 is a diagram of a computer environment suitable for practicing lockless burst trie indexing as disclosed herein.

FIG. 7 illustrates an example of a typical computer system in which lockless burst trie indexing as described herein can be implemented. Note that while FIG. 7 illustrates various components of a computer system, it is not intended to represent any particular architecture or manner of interconnecting the components as such details are not germane to the present invention. It will also be appreciated that network computers and other data processing systems which have fewer components or perhaps more components can also be used with the present invention. The computer system of FIG. 7 can, for example, be a Macintosh computer from Apple Inc.

As shown in FIG. 7, the computer system 700, which is a form of a data processing system, includes a bus 701 which is coupled to processor(s) 703 and NVRAM (non-volatile random access memory) 707, RAM 705, and storage device(s) 709. The bus 701 interconnects these various components together and also interconnects these components 703, 707, 705, 709 to a display controller and display device 715, and to peripheral devices such as input/output (I/O) devices 719, which can be mice, keyboards, modems, network interfaces, printers and other devices which are well known in the art. Typically, the input/output devices 719 are coupled to the system through input/output controllers 717. The RAM 705 is typically implemented as dynamic RAM (DRAM), which requires power continually in order to refresh or maintain the data in the memory.

The storage device 709 is typically a hard drive or an optical drive or other non-volatile storage devices that maintain data (e.g. large amounts of data) even after power is removed from the system. While FIG. 7 shows that the storage device 709 is a local device coupled directly to the rest of the components in the data processing system 700, it will be appreciated that the write and destroy operations can be performed on a storage device coupled remotely to the system 700, such as a network storage device that is coupled to the data processing system through a network interface such as a wireless or Ethernet interface. The bus 701 can include one or more buses connected to each other through various bridges, controllers and/or adapters as is well known in the art. In one embodiment, the I/O controller 717 includes a USB (Universal Serial Bus) adapter for controlling USB peripherals and an IEEE 1394 controller for IEEE 1394 compliant peripherals.

The description of FIG. 7 is intended to provide an overview of computer hardware and other operating components suitable for implementing the write and destroy operations, but is not intended to limit the applicable environments. It will be appreciated that the computer system 700 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Indexing data strings using a lockless burst trie has been described. Although specific embodiments have been illustrated and described herein, it will be appreciated by those of ordinary skill in the art that any arrangement which is calculated to achieve the same purpose can be substituted for the specific embodiments shown. This application is intended to cover any adaptations or variations of the present invention.

Figure 3:
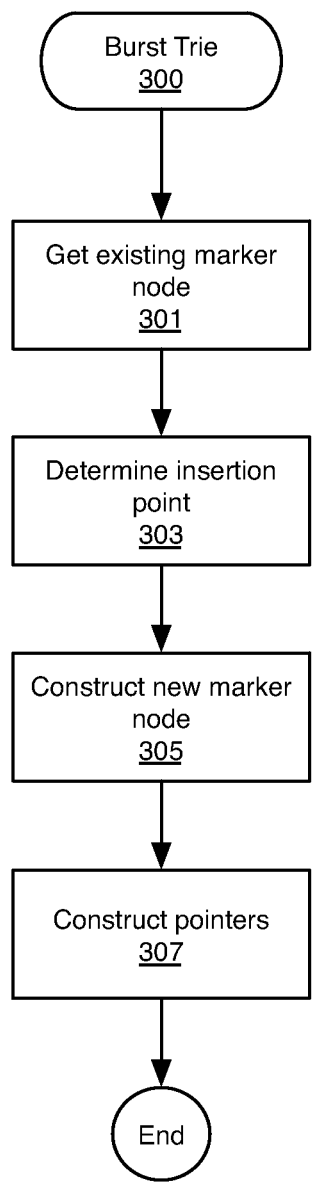
FIG. 3 is an embodiment of a flow diagram of a method to be performed by a computer executing lockless burst trie indexing software when a lockless trie is being burst.

For example, the methods 300, 500 and 600 constitute computer programs made up of machine-executable instructions illustrated as processing blocks in FIGS. 3, 5 and 6. Describing the methods by reference to a flow diagram enables one skilled in the art to develop such programs including such instructions to carry out the methods on suitably configured machines (the processor of the machine executing the instructions from machine-readable media, including memory) The machine-executable instructions can be written in a computer programming language or can be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages can be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer processes can be incorporated into the methods illustrated in FIGS. 2 and 7 without departing from the scope of the invention and that no particular order is implied by the arrangement of blocks shown and described herein.

The terminology used in this application with respect to file systems is meant to include all operating system environments that organize data into hierarchical directory structure. Therefore, it is manifestly intended that this invention be limited only by the following claims and equivalents thereof.

What is claimed is:

1. A method comprising:
   linking, by a processor, a new marker node to a corresponding data node in a linked list of nodes having a sorted order, wherein each data node represents a data sequence and the new marker node represents a data sequence that is a subset of the data sequence of the corresponding data node; and
   linking the new marker node to a corresponding entry in a burst trie structure, each entry representing a symbol, wherein entries in the burst trie structure are linked in a hierarchy of levels to represent data sequences that duplicate the data sequences represented by the marker nodes and the corresponding entry represents a symbol in the data sequence of the linked new marker node.

2. The method of claim 1 further comprising:
   linking the new marker node to an existing marker node in the linked list, the existing marker node linked to an entry in a different level of the burst trie structure than the level of the corresponding entry for the new marker node.

3. The method of claim 1 further comprising:
   determining an insertion point for the new marker node, wherein the insertion point is between two existing nodes and a pointer for a previous one of the existing nodes is used to link the new marker node into the linked list.

4. The method of claim 3 further comprising:
   constructing the new marker node; and
   determining a new insertion point if the pointer in the previous one of the existing nodes is not valid after constructing the new marker node.

5. The method of claim 3 further comprising:
   constructing the new marker node; and
   determining a new insertion point if the insertion point is not correct after constructing the new marker node.

6. The method of claim 1 further comprising:
   constructing a new data node for a new data sequence; and
   linking the new data node into the linked list after a corresponding marker node.

7. The method of claim 6, wherein the new marker node is constructed in response to adding the new data sequence.

8. The method of claim 1 further comprising:
   determining an entry in the burst trie structure to burst into a new level;
   constructing a new level marker node for each entry in the new level that represents a symbol in the data sequences;
   linking each of the new level marker nodes between an existing marker node corresponding to the burst entry and an existing node next in order in the linked list; and
   creating the new level in the burst trie structure.

9. The method of claim 8, wherein the entry to burst is determined in response to adding a new data sequence, and wherein the linking of each new level marker node and the creating of the new level are performed after linking a new data node corresponding to the new data sequence into the linked list.

10. A non-transitory computer readable storage medium having stored thereon executable instructions to cause a processor to perform operations comprising:
    linking a new marker node to a corresponding data node in a linked list of nodes having a sorted order, wherein each data node represents a data sequence and the new marker node represents a data sequence that is a subset of the data sequence of the corresponding data node; and
    linking the new marker node to a corresponding entry in a burst trie structure, each entry representing a symbol, wherein entries in the burst trie structure are linked in a hierarchy of levels to represent data sequences that duplicate the data sequences represented by the marker nodes and the corresponding entry represents a symbol in the data sequence of the linked new marker node.

11. The non-transitory computer readable storage medium of claim 10 further comprising:
    linking the new marker node to an existing marker node in the linked list, the existing marker node linked to an entry in a different level of the burst trie structure than the level of the corresponding entry for the new marker node.

12. The non-transitory computer readable storage medium of claim 10 further comprising:
    determining an insertion point for the new marker node, wherein the insertion point is between two existing nodes and a pointer for a previous one of the existing nodes is used to link the new marker node into the linked list.

13. The non-transitory computer readable storage medium of claim 12 further comprising:
constructing the new marker node; and
determining a new insertion point if the pointer in the previous one of the existing nodes is not valid after constructing the new marker node.

14. The non-transitory computer readable storage medium of claim 12 further comprising:
constructing the new marker node; and
determining a new insertion point if the insertion point is not correct after constructing the new marker node.

15. The non-transitory computer readable storage medium of claim 10 further comprising:
constructing a new data node for a new data sequence; and
linking the new data node into the linked list after a corresponding marker node.

16. The non-transitory computer readable storage medium of claim 15, wherein the new marker node is constructed in response to adding the new data sequence.

17. The non-transitory computer readable storage medium of claim 10 further comprising:
determining an entry in the burst trie structure to burst into a new level;
constructing a new level marker node for each entry in the new level that represents a symbol in the data sequences;
linking each new level marker node between an existing marker node corresponding to the burst entry and an existing node next in order in the linked list; and
creating the new level in the burst trie structure.

18. The non-transitory computer readable storage medium of claim 17, wherein the entry to burst is determined in response to adding a new data sequence, and wherein the linking of each new level marker node and the creating of the new level are performed after linking a new data node corresponding to the new data sequence into the linked list.

19. A system comprising:
a memory coupled to a processor through a bus, the memory storing a burst trie structure comprising entries linked in a hierarchy of levels to represent data sequences that duplicate data sequences represented by marker nodes, each entry representing a symbol in data sequences indexed by the burst trie structure, with entries in a lowest level linked to the marker nodes in a linked list of nodes having a sorted order, the linked list further comprising data nodes representing the data sequences; and
a burst trie structure process executing from the memory by the processor, in response to receiving a new data sequence through the bus, to cause the processor to
construct a new marker node representing a data sequence that is a prefix of the new data sequence,
determine an insertion point for the new marker node in the linked list, wherein the insertion point is between an existing node and a new data node that represents the new data sequence,
link the new marker node into the linked list at the insertion point, and
link the new marker node to a corresponding entry in the burst trie structure, wherein when the corresponding entry needs to be burst to create a new level, the processor further constructs a new level marker node for each entry in the new level that represents a symbol in the data sequences, links each new level marker node between the existing marker node corresponding to the burst entry, and creates the new level in the burst trie structure.

20. The system of claim 19, the burst trie structure process further causing the processor to read the burst trie structure from a non-volatile storage device into the memory.

* * * * *